Dec. 12, 1939.     F. B. WENDEL     2,183,271
PIPE FITTING AND METHOD OF PRODUCING THE SAME
Filed March 7, 1938     2 Sheets-Sheet 1
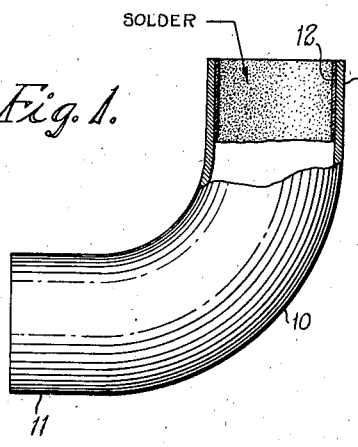
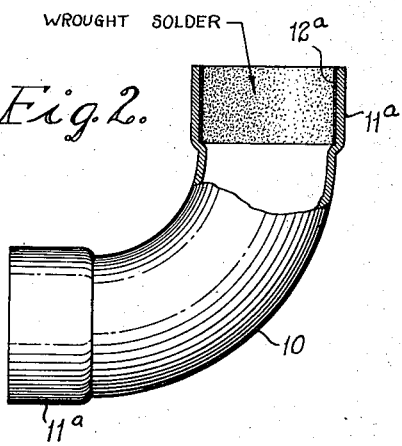
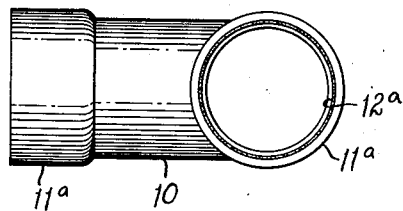
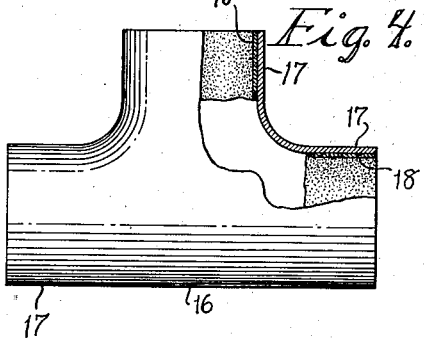
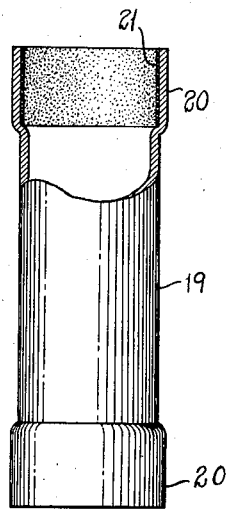
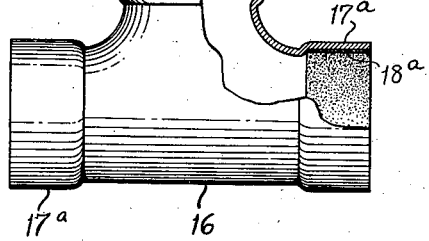
Inventor
Frans B. Wendel
By Seymour Earle Nichol
Attorneys Dec. 12, 1939.  F. B. WENDEL  2,183,271
PIPE FITTING AND METHOD OF PRODUCING THE SAME
Filed March 7, 1938  2 Sheets-Sheet 2
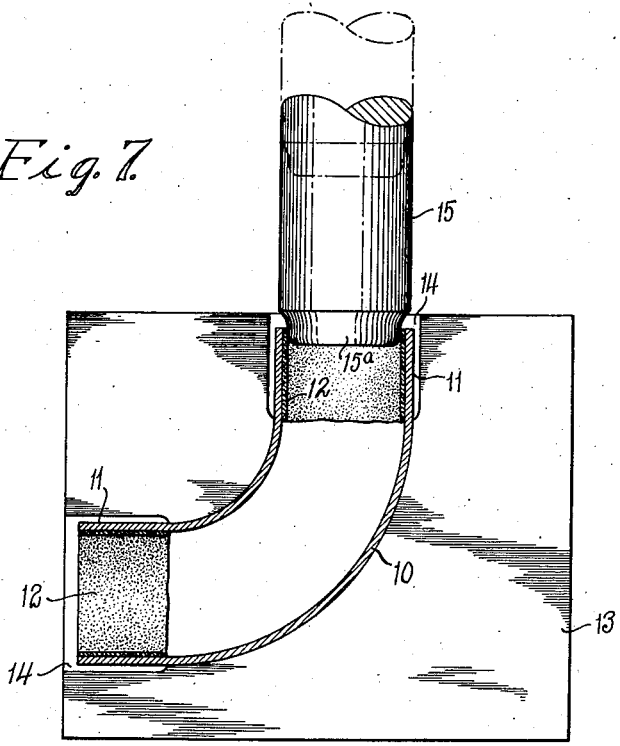
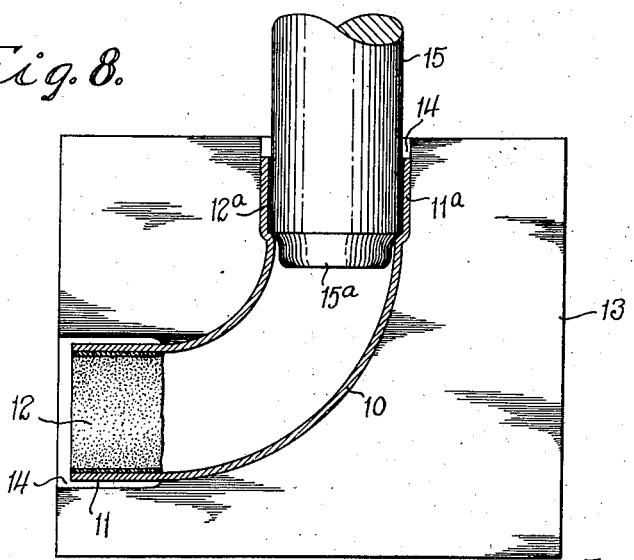
Inventor
By Frans B. Wendel
Seymour Earle Nichols
Attorneys Patented Dec. 12, 1939

2,183,271

UNITED STATES PATENT OFFICE 2,183,271

PIPE FITTING AND METHOD OF PRODUCING THE SAME

Frans Bertil Wendel, Waterbury, Conn.

Application March 7, 1938, Serial No. 194,253

3 Claims. (Cl. 29—157)

This invention relates to the construction and method of fabricating the terminals of elbows, T's, and other pipe fittings of the type designed to telescopically interfit with one another or with other pipes, tubes or the like, for the purpose of connecting such elements together by means of sweat-soldered joints.

The general object of the invention is to provide an improved construction for and method of fabricating pipe fitting terminals of the type referred to whereby the telescopically interfitting terminals may be connected by sweat-soldered joints of higher quality than those in common use at the present time.

One of the objects of the present invention is to provide an improved construction for and method of fabricating pipe fitting terminals whereby the surfaces to be united may be evenly and uniformly coated with solder or its equivalent, worked on and distributed over said surfaces in a manner that renders the solder-coated surfaces smooth and practically free from lumps or irregularities of any nature. In this way, the surface which is to be sweat-soldered to an interfitting terminal of another pipe fitting or pipe, can be sized with a higher degree of accuracy without making it difficult to assemble the telescoping terminals while at the same time providing a smoother and more intimate contacting relation between the surfaces to be joined.

Another object of the invention is to provide an improved construction for and method of fabricating sized solder-coated pipe fitting terminals of bellmouth form in such a way as to facilitate their production in quantity by means of a metal-working tool such, for example, as a sizing mandrel of the plunger type whereby the precoated inner walls of the pipe fitting terminals may be worked on and over the surfaces to be united by sweat-soldered joints while the pipe fitting terminals are in process of being sized. For this purpose, a further object of the invention resides in the utilization of the solder coating on the inner wall of the unsized pipe fitting terminal to lubricate the forcible introduction thereinto of the expanding mandrel or other tool and thus to facilitate this operation while, at the same time, greatly improving the surface and quality of the solder for the subsequent production of a sweat-soldered joint by a local application of heat.

For some kinds of work requiring pipe fittings which interfit telescopically with a high degree of accuracy and in which soldered joints of exceptional strength are desirable, the present invention comprehends the provision of a terminal-expansion cavity in the fitting holder having confining walls of suitable construction and arrangement to effect a swaging operation on the wall of a pipe fitting terminal which has been precoated with solder by producing a squeezing action on the solder-coated metal between the downwardly-moving mandrel and the confining wall of said cavity.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a side elevation, partly in section to show a wrought-metal elbow provided with a solder-coated inner wall in readiness for the sizing operation;

Fig. 2 is a side elevation similar to Fig. 1, partly in section to show the completed elbow;

Fig. 3 is a top plan view of Fig. 2;

Fig. 4 is a side elevation of a T, prior to the sizing of its terminals, a portion of the wall being broken away to show a precoating of solder on the inner walls of the unsized terminals according to the present invention;

Fig. 5 is a similar side elevation of the finished T, parts being broken away to show the sized inner walls of wrought solder;

Fig. 6 is an elevational view partly in section of a pipe or tube coupling provided at opposite ends with bellmouth terminals constructed in the manner contemplated by the present invention;

Fig. 7 is a schematic view in vertical section of a preferred form of the terminal sizing apparatus employed in the fabrication of pipe fittings in accordance with the present invention, the sizing mandrel being shown at the commencement of its terminal-expanding movement; and Fig. 8 is a schematic view similar to Fig. 7, showing the sizing mandrel at the end of its downward stroke with the terminal expanded to size.

The drawings show adaptations of the invention to several kinds of pipe fittings preferably formed of wrought copper or other readily solderable material, and suitable for use in the sanitary piping of houses, office buildings and other structures.

According to Figs. 1, 2 and 3, the invention is embodied in an elbow pipe fitting of double bellmouth form. In its partly-finished form shown in Fig. 1, the body-portion 10 of the pipe fitting is shown with an unsized terminal-portion 11 provided around its inner wall with a coating 12 of solder or its equivalent which is preferably applied thereto by protecting the exterior surface with a suitable coating (such as oxide) to guard against the adhesion thereto of solder or the like and then dipping the terminal, heated to a suitable degree for this purpose, in a molten bath of solder. Under this treatment, the inner wall of the unsized terminal becomes coated with solder which is bonded thereto by a surface alloy and thus prepared to undergo, to the best advantage, an ironing or swaging operation to which it is subsequently subjected.

After the dipping treatment, the elbow with its solder-coated terminal is placed in a fitting-holder (Fig. 7) comprising two opposed separable holder-blocks 13, one of said holder-blocks being removed, according to the drawings to show the disposition of the elbow in the fitting-holder. The complementary holder-blocks 13 are provided with matched recesses to accommodate the body-portion 10 of an elbow, said recesses being expanded at opposite ends to provide matched cavities 14 into which the terminal-portions 11 project when the holder-blocks 13 have been clamped or otherwise secured together. The parts, thus assembled, are mounted or supported in any suitable manner, with one of the terminal-portions 11 of the elbow coaxially arranged with respect to an ironing or swaging tool which is preferably in the form of a terminal-sizing mandrel 15 indicated diagrammatically in Figs. 7 and 8.

The mandrel 15 is preferably formed of suitably-hardened tooled steel and has its outer peripheral surface carefully ground to a diameter corresponding to the desired internal diameter of the pipe fitting terminal.

As the mandrel 15 descends, under the action of any suitable press (not shown), a pilot-lip 15ª at the lower end thereof is caused to enter the unsized terminal-portion 11 of the elbow and as the downward movement of said mandrel continues, the accurately-sized body-portion thereof is forcibly introduced into said terminal-portion in such a way as to expand it into a bellmouth terminal 11a of the form shown in Fig. 2, and in the manner indicated in Fig. 8 which shows the mandrel at the lower limit of its movement. During this action of the mandrel 15, its downward movement is effectively lubricated by the solder-coating 12 which, in turn, is worked or wrought on and distributed over the joining surface of the terminal in a uniformly-smooth and evenly-applied layer as indicated by the reference character 12a in Figs. 2 and 3. In like manner, the other terminal-portion 11 of the elbow may be sized while, at the same time, it is being provided with a wrought solder coating, which fuses easily, and readily unites with the surface to which it is applied to form a surface alloy therewith.

In a manner substantially similar to that described above, the wrought-metal triple male T 16 shown in Fig. 4, may be converted to the triple female T shown in Fig. 5. For this purpose, the inner surface of each male pipe fitting terminal 17 may be provided with a solder-coating 18 and by means of an accurately-sized mandrel, such as that shown at 15 in Fig. 7, is readily converted to the triple T of bellmouth form shown in Fig. 5 according to which each terminal 17a of the fitting is provided with a sized coating 18a of wrought solder which, due to the ironing effects thereon by the mandrel, is smoothly and evenly distributed over the inner surface of the terminal and rendered free from lumps and other irregularities which, otherwise, militate against the formation of a high-class sweat-soldered connection.

Fig. 6 shows a finished wrought-copper coupling 19 with finished form, bellmouth terminals 20 provided on their inner walls with sized coatings 21 of wrought solder, said terminals being formed in a manner substantially similar to that described above in connection with the elbow and T pipe fittings.

Pipe fitting terminals of various cross-sectional forms such, for example, as oval, hexagonal, etc., may be produced, by the method described above, by the use of swaging dies and mandrels of the desired cross-sectional form.

The term "solder" used in the foregoing specification, is intended to include all suitable solders, brazing materials, and other heat-softenable metallic uniting materials having an effective melting point well below the melting point of the pipe fitting to which the said solder is applied. It will be understood that while the thickness of the solder-coating may be as little as .002 inch, it has been shown in the drawings on a greatly exaggerated scale for convenience in referring thereto.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A method of fabricating wrought-metal pipe fittings having bellmouthed terminals, which method comprises: coating with solder or the like that portion of the inner surface of an unsized pipe fitting terminal which corresponds in area and arrangement to the surface portion of a bellmouthed terminal which is to be finished for telescopic interfitting engagement with and to be united by a sweat-soldered joint to the male terminal of a pipe or another pipe fitting; and finishing said terminal by forcibly introducing into the pre-coated unsized pipe fitting terminal an expanding mandrel having a working surface of predetermined size and shape to size the said pre-coated unsized terminal and to effect a cold-working of the solder coating in situ on the inner surface which is to engage with and be fused to said pipe or other pipe fitting.

2. A method of fabricating the bellmouthed terminals of wrought-metal pipe fittings of the type designed to be telescopically interfitted with and united by a sweat-soldered operation to another pipe fitting or pipe, which method comprises: dipping an unsized terminal of the pipe fitting into a molten bath of solder or its equivalent to coat with solder or its equivalent, a surface portion thereof corresponding to the coated inner surface portion of predetermined size and contour of a bellmouthed terminal which is to be finished for telescopic interfitting engagement with and to be united by a sweat-soldered joint to the male terminal of another pipe fitting or pipe; and finishing said terminal by subsequently forcibly introducing into the solder-coated unsized terminal of the pipe fitting, an expanding mandrel having a working surface of predetermined size and shape to size the bellmouthed terminal while, at the same time, ironing out the solder-coating on the inner wall thereof to effect an even distribution of the solder and the sizing of the solder-coated unsized terminal.

3. A wrought-metal pipe fitting provided with an initially-unsized terminal-portion having an opening dimensioned for forcible entry of an expanding-mandrel therein, the said unsized-terminal-portion also having a coating of solder substantially covering an inner area intended to telescopically receive a terminal of another pipe fitting or pipe; and the said pipe fitting being provided by means of said expanding-mandrel and cold-working of the said unsized-terminal-portion and of the said solder-coating thereof, with a finished, sized and expanded, bellmouthed terminal having a coating of solder ironed to substantially-uniform density thereon and covering substantially the entire inner surface of the said bellmouthed terminal, for telescopically receiving therein the terminal of another pipe fitting or pipe, and for being united therewith by a sweat-soldered joint.

FRANS BERTIL WENDEL.